United States Patent [19]

Nelson et al.

[11] 4,148,952
[45] Apr. 10, 1979

[54] STABLE BLOCKS FORMED OF SHREDDED PAPER-LIKE MATERIAL

[75] Inventors: Gerald B. Nelson, San Diego; William J. Prindle, La Mesa, both of Calif.

[73] Assignee: Papakube Corp., San Diego, Calif.

[21] Appl. No.: 516,280

[22] Filed: Oct. 21, 1974

Related U.S. Application Data

[63] Continuation of Ser. No. 364,806, May 29, 1973, abandoned, which is a continuation-in-part of Ser. No. 225,122, Feb. 10, 1972, abandoned.

[51] Int. Cl.² .......................................... B65D 71/00
[52] U.S. Cl. .......................................... 428/2; 241/3; 264/118; 428/318; 428/409; 428/913
[58] Field of Search ............... 161/162, 168, 161, 166, 161/7, 170; 264/118; 156/62.2, 62.4; 241/3, 4, 14, 15, 24; 428/2, 74, 913, 218, 318, 319, 326, 409, 317; 162/4

[56] References Cited

U.S. PATENT DOCUMENTS

| 1,812,969 | 7/1931 | Mason | 162/163 |
|---|---|---|---|
| 3,403,074 | 9/1968 | Emerson | 162/163 |
| 3,654,048 | 4/1972 | Bathgate | 161/7 |
| 3,664,076 | 5/1972 | McCoy | 52/309 |
| 3,718,536 | 2/1973 | Downs | 161/168 |
| 3,736,221 | 5/1973 | Evers et al. | 161/170 |
| 3,763,621 | 10/1973 | Klein et al. | 53/24 |

Primary Examiner—William J. Van Balen
Attorney, Agent, or Firm—Ellsworth R. Roston

[57] ABSTRACT

A stable block is formed of shredded paper or paper-like material (herein after referred to as "paper") and a binder such as ligninsulfonate. The block is formed by shredding paper, mixing the shreds with a binder such as ligninsulfonate resin, and placing the same in a heated matrix of a die; and while in the die, subjecting the mixture to high pressure.

1 Claim, 4 Drawing Figures

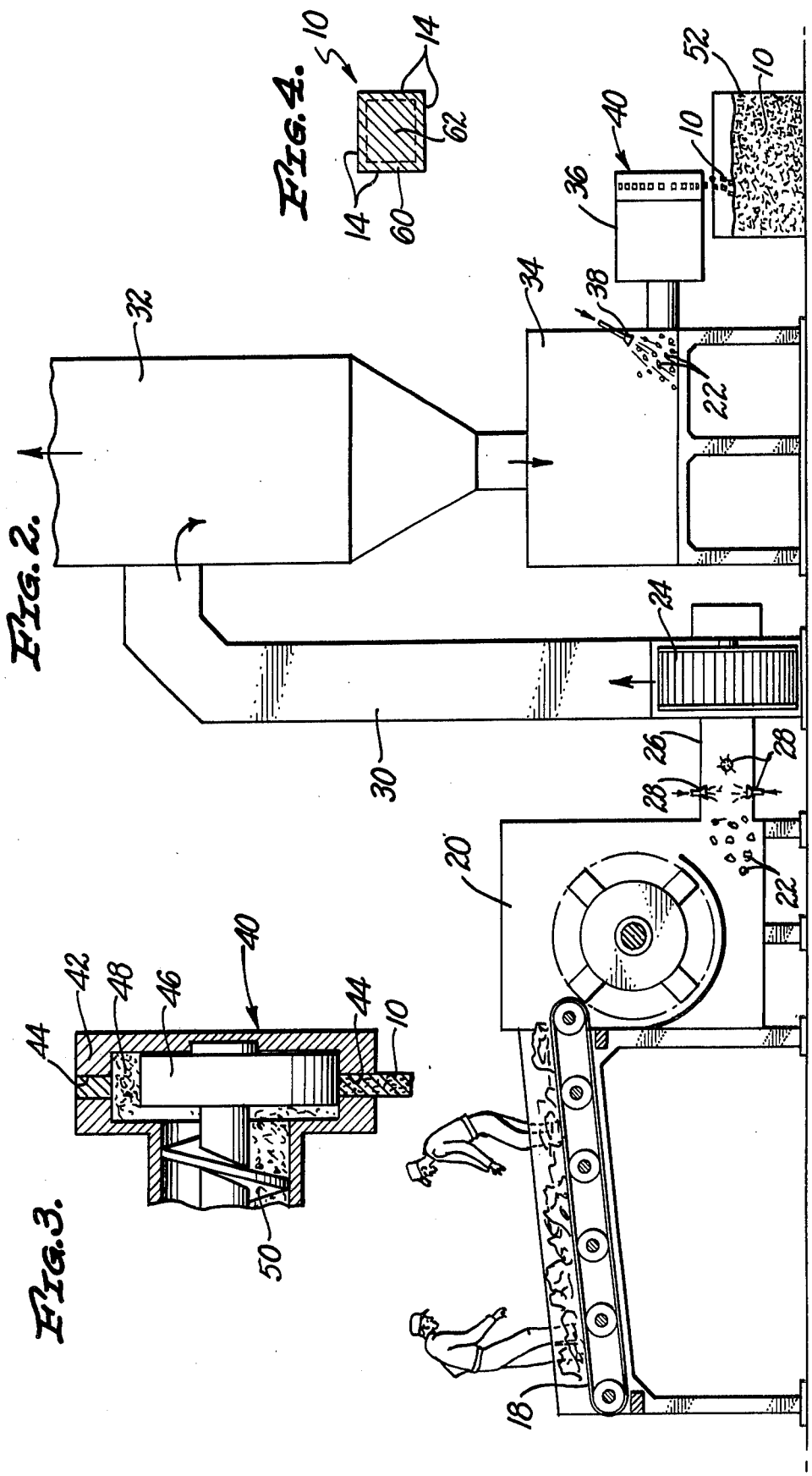

STABLE BLOCKS FORMED OF SHREDDED PAPER-LIKE MATERIAL

This is a continuation of application Ser. No. 364,806, filed May 29, 1973, now abandoned which in turn is a continuation-in-part of application Ser. No. 225,122, filed Feb. 10, 1972, now abandoned.

BACKGROUND OF THE INVENTION

1. Field of the Invention:

The invention is directed to forming stable blocks of shredded paper.

In recent years, there has been a growing awareness of the need to preserve natural resources. In this regard, it has been discovered that paper, such as newspapers, can be suitably processed and reused.

To reuse paper, it is necessary to first collect the paper at numerous locations, tie it into bales, containerize the bales, and then ship it to a central plant where it is processed for reuse. One problem with this form of shipment is that the freight charges are relatively high and this adversely affects the cost of paper recycling.

2. Description of the Prior Art:

The patent to Mason, U.S. Pat. No. 1,812,969, discloses the use of lignins for producing a welding or coalescing of cellulose fibers under conditions of heat, moisture and pressure. U.S. Pat. No. 3,403,074 to Goss discloses boards that are formed of cellulosic fiber utilizing ligninsulfonate resin as a binder for making cellulosic board. U.S. Pat. No. 3,403,074 to Emerson discloses a process of impregnating web board with sulfite lignin liquor and an acid. None of these patents discloses the use of shredded paper and a binder to form stable blocks.

SUMMARY OF THE INVENTION

The present invention reduces the cost of paper recycling by providing a method of converting the paper to be recyled into stable blocks. With the paper converted to block form, it can be shipped in bulk form. The freight rate for bulk products is less than for baled materials, and therefore there is a substantial freight savings. In addition, baling is eliminated. Finally, the handling charges are reduced because the blocks can be loaded and unloaded by machine.

The blocks, which can be of various sizes and shapes, are composed of paper fragments packed tightly together. The paper fragments are held tightly together by a suitable binder or adhesive. Each of the blocks is stable and rigid. As such, each of the blocks has a configuration which is maintained during normal handling and transportation. However, the blocks can be broken up for reuse at the recylcing plant. To facilitate breaking up of the blocks, the binder is water soluble.

Each of the blocks is a solid, substantially homogeneous mass. At least a portion of the outer surface of each block has a smooth, glazed appearance.

To convert paper into blocks, the reusable paper is first separated from nonreusable items, and is then fed to a shredder. The shredder shreds the paper to form paper fragments. The paper fragments are moistened with a moistening agent such as water. The water, among other things, holds down the dust as the fragments are being transported through the processing equipment.

The moistened paper fragments are transported toward a cuber. At or upstream of the cuber an adhesive or binder diluted in water is applied to the paper fragments. The cuber applies heat and pressure to the paper fragments, and this forms the fragments into stable blocks. This can advantageously be carried out in an extrusion process with the extrusion dies preheated to apply heat to the adhesive and the paper fragments. The pressure forces the paper fragments together in tightly packed relationship and the binder holds the fragments together in this same relationship.

Thus, the present invention includes a process which forms a stable block formed of shredded paper and a binding agent, which process comprises shredding paper, such as the common newspaper, into sizes which range from minute particles to sections having a width of several inches, adding a binder having substantially the characteristics of ligninsulfonate resin, then placing the mixture in the matrix of a die, which matrix has been preheated to between 125° F. and 200° F., and then subjecting the mixture to approximately 7000 pounds of pressure per square inch.

Other features and the advantages of the present invention will be apparent from the following description, reference being made to the accompanying drawing wherein a preferred embodiment of the invention is illustrated.

BRIEF DESCRIPTION OF THE DRAWING

FIG. 2 is a schematic view of an apparatus for carrying out a process in accordance with the teachings of this invention.

FIG. 3 is a somewhat schematic, fragmentary sectional view illustrating one manner in which the blocks may be extruded.

FIG. 4 is a sectional view through the block.

DESCRIPTION OF THE PREFERRED EMBODIMENT

Figure 1:
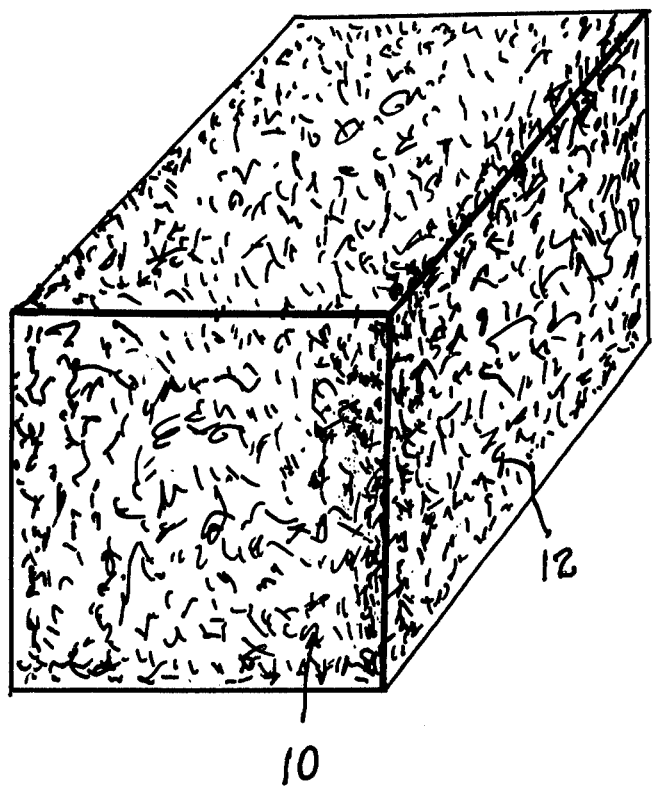
FIG. 1 is a perspective view of a block constructed in accordance with the teachings of this invention.

The block 10, shown in FIG. 1 of the drawing, is on an enlarged scale. The block may be of many different sizes and shapes, but the matrix of the die (not shown in FIG. 1) would have preferably a cross sectional width of approximately one and one-quarter inch and have a length of six to ten inches. The block depicted herein shows the colored or block spots 12 formed by letters, etc., that were printed on the paper.

The block 10 is constructed of a plurality of paper fragments and an adhesive or binder. The quantity of binder used should be held to a minimum. From ½% to about 6% by weight of the block 10 may be binder and the remainder of the block is composed of paper fragments. After the block 10 cures, a portion of the binder evaporates, and this reduces the percentage of binder in the cured block. For example, the cured block 10 may have from about ½% to about 3% by weight of binder.

The paper fragments of the block 10 are packed as closely and tightly together as possible to thereby minimize internal voids. The block 10 is solid and substantially homogeneous. The block 10 has peripheral surfaces 14 which have a smooth, glazed appearance and opposite end faces 16 which may appear rough. The block 10 is rigid and will retain its shape during normal handling and transport. The density of the block is about 55 to 80 pounds per cubic foot. The block 10 shown in FIG. 1 is generally in the form of a rectangular solid.

In practicing the invention, newspapers, magazines, etc., are shredded in any suitable manner such as, for example, by the apparatus shown in the patent to Burden, Jr., et al. U.S. Pat. No. 3,524,597. The paper, when so shredded, ranges in size from a pin head to several inches in width and length.

A binder is then added to the shredded paper. Any desired form of mixing machine is employed for that function. The binder is in the form of a resin such as a resin having substantially the same characteristics as ligninsulfonate resin, preferably ligninsulfonate resin.

The shredded paper is then placed in the receiving section or matrix of a die, the section having been preheated to a temperature between 125° F. and 200° F. and preferably at approximately 175° F. A force is then applied to the paper fragments 22 which causes them to extrude through the die. The optimum dwell time in the die is approximately five to seven seconds. A pressure of between 5,000 to 10,000 pounds per square inch, preferably approximately 7,000 pounds per square inch is developed in the die.

Depending on the character of the shredded paper, the ratio of the binding agent comprises between one-half and six percent by weight of the mixture. When the shredded paper is predominately newspaper, the binding agent comprises approximately one percent by weight of the mixture. In that state, the blocks, though stable, can be torn apart manually and shredded readily to form a homogeneous mass. The blocks are shipped as an aggregate to, for example, places in the world where wood is scarce and too expensive to be used for making paper. When pulped at those places, the homogeneous mass can be used for forming paper and for forming cellulosic elements such as, for example, paperboard, chipboard and wallboard.

More specifically, with reference to FIG. 2, a preferred process includes first sorting from collected material, the paper which is suitable for recycling and disposing of any contaminants, i.e., paper or other material not suitable for recycling. The sorting function may be carried out manually on a sorting table or conveyor 18 which conveys the paper past a sorting station.

The paper suitable for recycling is transported by the sorting table 18 to a shredder 20. The shredder 20, which may be of conventional construction shreds the paper to form paper fragments 22. The process of this invention is not dependent upon the paper fragments 22 being of any particular size or gradation. However, the paper fragments 22 are preferably not so small that they form dust. On the other hand, the paper fragments 22 should be sufficiently small so that they will "flow," i.e., be readily conveyable at a regulated rate.

Next, the paper fragments 22 are drawn by a fan 24 out of the shredder 20 and through a conduit 26. As the paper fragments 22 pass through the conduit 26, they are sprayed with a moistening agent such as water by a plurality of nozzles 28 (three being shown in FIG. 2). The nozzles 28 wet the paper fragments 22 and reduce the dust that would result from the very fine paper fragments 22 produced by the shredder 20.

The conduit 26 terminates in the inlet of the fan 24. The fan 24 forces the paper fragments 22 upwardly through a vertical duct 30 to a cyclone 32 which separates the air from the dust and the paper fragments 22. The air is allowed to escape upwardly into the atmosphere and the paper fragments 22 fall down through the cyclone 32 to a regulator 34. The fan 24 and the cyclone 32 may be a standard air conveying system.

The regulator 34 controls the flow of the paper fragments 22 into the cuber 36. The regulator 34 may be of the type commonly employed in regulating the flow of alfalfa. Similarly, the cuber 36 may be of the type commonly used to form blocks or cubes of alfalfa.

Adjacent the outlet of the regulator 34, a spray nozzle 38 sprays the paper fragments 22 with an aqueous binder mixture. As discussed above, the binder is in the form of a water soluble adhesive of the type suitable to cause the paper fragments to adhere to each other. Ligninsulfonate resin is preferred. Any of the usual metal salts, such as ammonium, magnesium, calcium, and sodium of ligninsulfonate resin may be used. Sufficient water is added to the ligninsulfonate resin to make it flowable. For example, the binder may include 75–80% by weight of water and 25–20% by weight of ligninsulfonate resin. The water dilutes the binder and provides a further wetting action for the paper fragments 22 which helps prepare the fragments for the operation to be performed by the cuber 36. Preferably the amount of water in the mixture in the cuber 36 is about 12–15% by weight and the amount of ligninsulfonate resin or other suitable binder in the cuber is about ½% to about 3% by weight. Sufficient water should be added by the spray nozzles 28 and 38 to provide this amount of water. Preferably the majority of the water will be added by the spray nozzles 38.

The paper fragments 22 ladened with the binder are conveyed by a conveyor (not shown) to the cuber 36. The cuber 36 receives the moistened and binder carrying paper fragments 22 and forms them into many of the blocks 10. The cuber 36 includes an extrusion apparatus 40 shown in FIG. 3. The extrusion apparatus 40 includes a die ring 42 defining a plurality of radially extending die passages 44. An eccentric 46 is mounted within the die ring 42. The paper fragments 22 are forced into a peripheral gap 48 separating a portion of the eccentric 46 from the die ring 42 in any suitable manner such as by an auger 50. By relatively rotating the eccentric 46 and the die ring 42, the eccentric forces the paper fragments through the die passages 44 in a sequential manner. The paper fragments 22 are under pressure of from 5,000 to 10,000 psi during the extrusion process. This packs the paper fragments tightly together and the binder tends to hold them in this closely packed condition. The material extruded through the die passages 44 is suitably broken off from the material remaining within the die passage and allowed to fall into a receptacle 52 (FIG. 2) with each segment of such extruded and broken off material forming one of the blocks 10.

The cuber 36 should add heat to the paper fragments 22. The surfaces defining the die passages 44 may be preheated to about 125° F. to about 200° F. by an external source (not shown) or as a result of friction in the dies. When preheated, the temperature of the die passages 44 will be maintained by friction with the paper fragments.

In the receptacle 52, the blocks 10 are allowed to cure. During the curing process, the surface water evaporates from the block leaving a block consisting essentially of paper and ligninsulfonate resin. The voids caused by evaporation of the water are minimal.

The glaze on the peripheral surfaces 14 of the block 10 is formed by rubbing contact of these surfaces against the surfaces of the die passages 44. The block 10 is, in effect, case hardened at the peripheral surfaces 44. Although the paper fragments 22 are adhered together at some locations within the block 10, it has been found that the primary adhesion occurs in a peripheral zone 60 (FIG. 4) of block 10, i.e., the paper fragments 22 are adhered together more completely in the zone 60 than in a region 62 which is further within the block.

Although exemplary embodiments of the invention have been shown and described, many changes, modifications and substitutions may be made by one having ordinary skill in the art without necessarily departing from the spirit and scope of this invention.

We claim:

1. A block comprising:
   a plurality of fragments of paper packed tightly together in a stable and homogeneous form and capable of being shredded to form a homogeneous mass;
   a water soluble binder having properties of adhering the fragments of paper into the stable and homogeneous form upon an application of heat and pressure to the binder and the fragments, the water soluble binder being included for holding said fragments of paper in closely packed relationship in the stable and homogeneous form;
   said block being rigid and stable until being shredded to form the homogeneous mass; and
   a binder included in the stable block in a percentage by weight in the order of one-half percent (½%) to three percent (3%).